United States Patent [19]

Collins

[11] 4,285,334
[45] Aug. 25, 1981

[54] SOLAR HEATING SYSTEM

[75] Inventor: Denver G. Collins, Ashland City, Tenn.

[73] Assignee: State Industries, Inc., Ashland City, Tenn.

[21] Appl. No.: 105,585

[22] Filed: Dec. 20, 1979

Related U.S. Application Data

[63] Continuation of Ser. No. 877,324, Feb. 13, 1978, abandoned.

[51] Int. Cl.³ ............................................. F24J 3/02
[52] U.S. Cl. ............................. 126/437; 126/422; 126/435; 126/400; 165/104.31
[58] Field of Search ............... 126/422, 427, 432, 434, 126/435, 437, 444, 445, 446, 901, 900, 428, 420, 400; 106/45; 428/450; 165/180, 170, 133, 104 S

[56] References Cited

U.S. PATENT DOCUMENTS

| | | | |
|---|---|---|---|
| 1,604,395 | 10/1926 | Ekert | 106/45 |
| 3,998,207 | 12/1976 | Watt | 126/400 |
| 4,044,948 | 8/1977 | Bottum et al. | 126/400 |
| 4,085,734 | 4/1978 | Gibbs | 126/450 |
| 4,086,910 | 5/1978 | Rowland | 126/444 |
| 4,105,822 | 8/1978 | DeJong | 126/901 X |
| 4,114,600 | 9/1978 | Newton | 126/422 |
| 4,126,122 | 11/1978 | Bross | 126/437 X |
| 4,137,900 | 2/1979 | Brautigam | 126/437 X |
| 4,153,043 | 5/1979 | Goolsby | 126/437 X |
| 4,159,017 | 6/1979 | Novi | 126/901 X |

*Primary Examiner*—Larry Jones
*Attorney, Agent, or Firm*—Michael, Best & Friedrich

[57] ABSTRACT

A solar water heating system including a solar collector panel and a combination storage tank and heat exchanger unit for receiving liquid heated in the solar collector panel. The collector panel includes a collector plate made from a pair of steel plates welded together and having a heat absorbing porcelain glass coating on the surface thereof which is exposed to the suns rays. The heat exchanger unit is comprised of a storage tank containing the water to be heated and a plurality of vertically extending heat exchange tubes mounted inside and sealed from the water in the storage tank. The liquid heated in the collector plate is circulated by a pump unit through a first conduit connected between the bottom of the heat exchange tubes and the inlet of the collector plate and through a second conduit from the outlet of the collector plate to the top of the heat exchange tubes. An air transfer conduit is connected in parallel flow relationship with the second conduit to facilitate complete and rapid drainage of the collector plate and exposed piping when the circulation pump is shut off.

3 Claims, 6 Drawing Figures

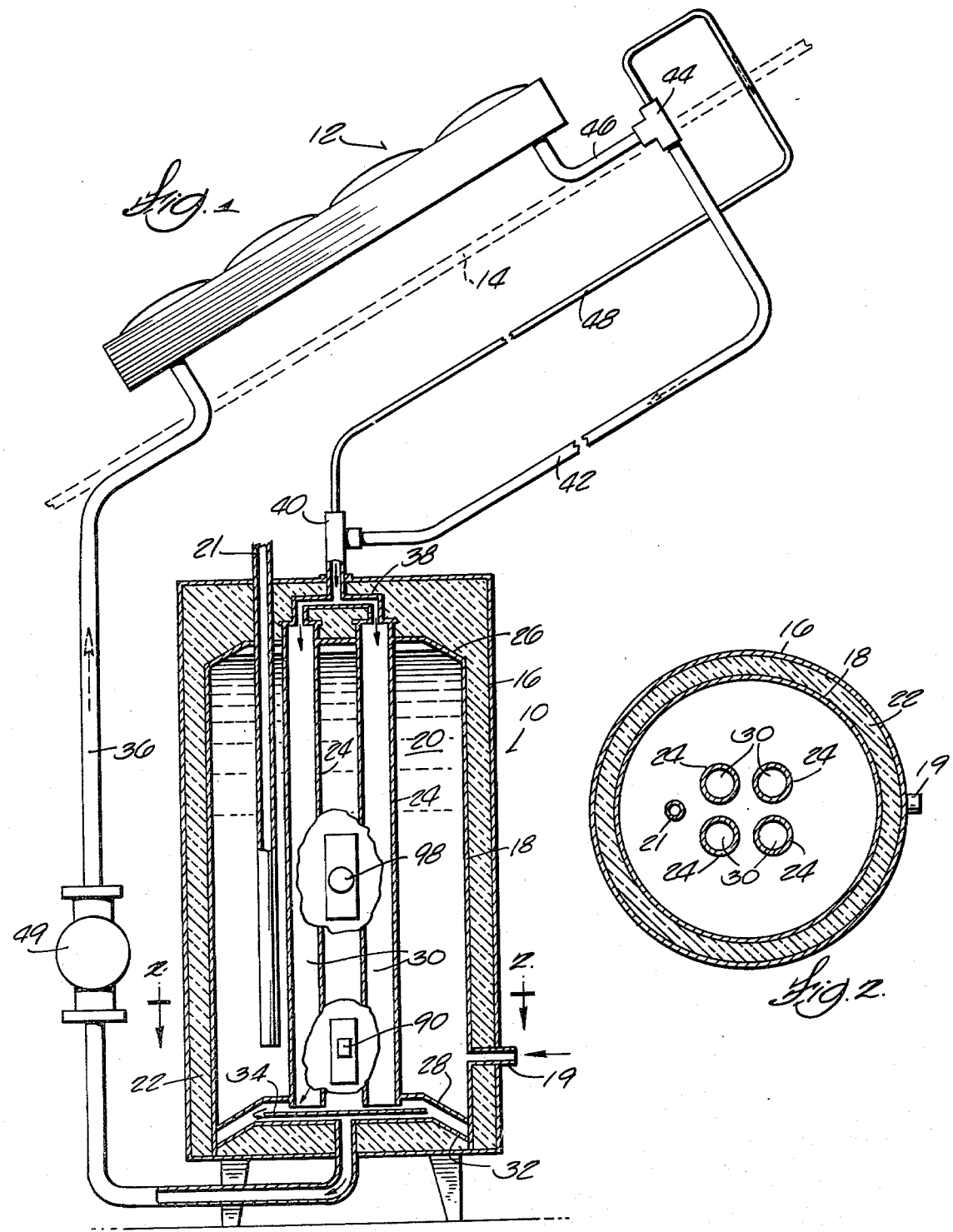

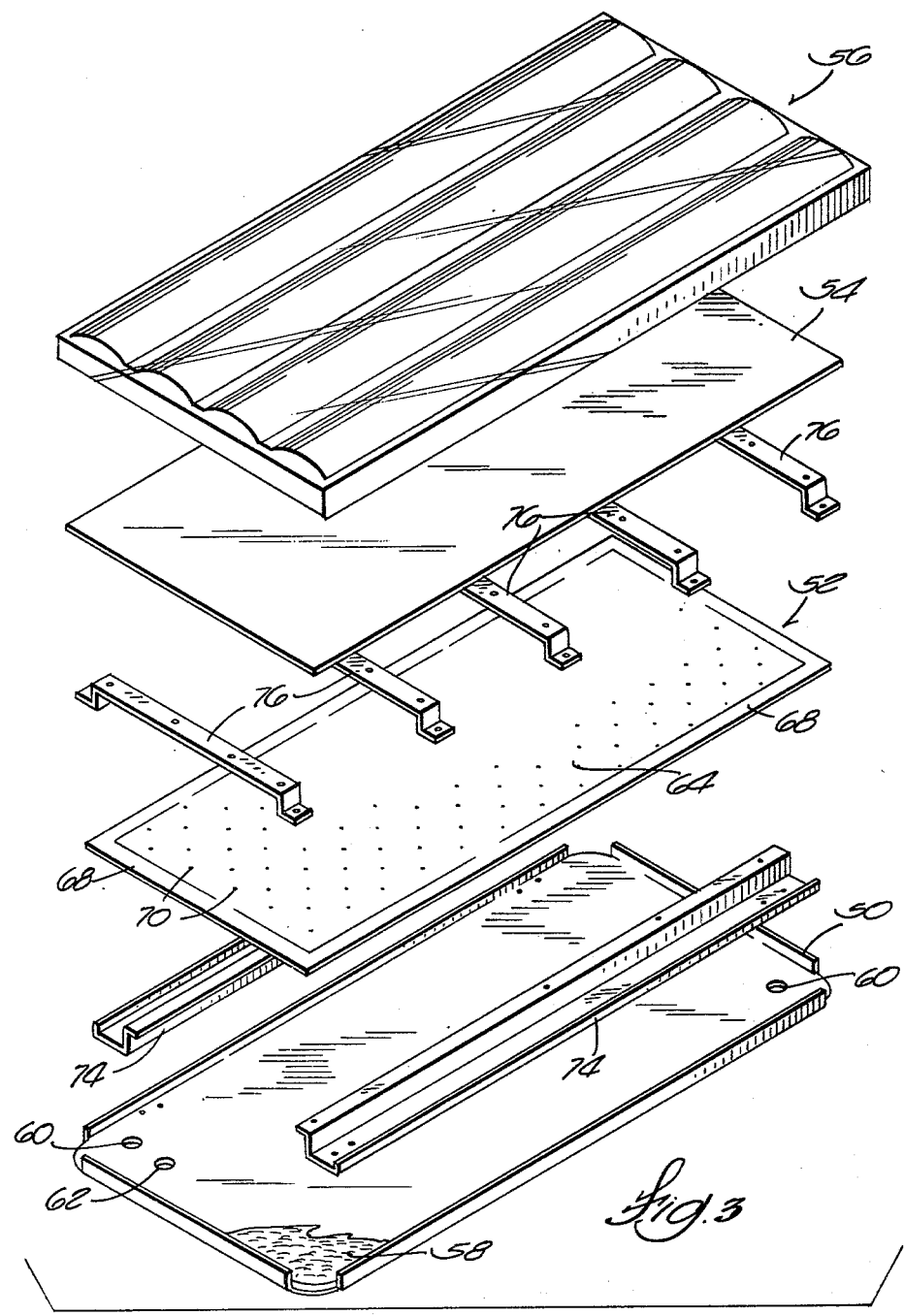

SOLAR HEATING SYSTEM

CROSS REFERENCE TO RELATED APPLICATION

This is a continuation of application Ser. No. 877,324, filed Feb. 13, 1978.

BACKGROUND OF THE INVENTION

1. Field of the Invention

This invention relates to a solar heating system and more particularly to a solar system for heating water.

2. Description of the Prior Art

The particular considerations in designing the solar water heating system of the present invention were solar conversion efficiency, durability, and simplicity of design. The porcelain glass coated steel collector plates utilized in the present design provide high solar conversion efficiency with long life. In addition the particular piping arrangement between the solar collector panel and the heat exchanger unit provides complete and rapid drainage of the collector plate and exposed piping when the circulation pump is shut down thus permitting the use of a non-contaminating heat exchange medium such as distilled water. The piping arrangement which provides the desired draining feature is of relatively simple design requiring no special values, vents, etc. for its operation.

SUMMARY OF THE INVENTION

A solar heating system for heating a fluid including a solar panel position to receive rays from the sun. The panel includes a collector plate adapted to receive the suns rays on a surface thereof and to convert such rays into heat energy. The second major component of the system is a combination storage tank and heat exchanger unit located at an elevation lower than that of the collector panel. A conduit means and pump are provided to facilitate circulation of a fluid heat exchange medium between the collector plate and the heat exchange unit. The conduit means includes a first conduit to carry fluid from the heat exchanger to the collector plate and a second conduit for carrying solar heated fluid from the collector plate to the heat exchanger unit. A third air transfer conduit is connected to parallel flow relationship with the second conduit to facilitate complete and rapid drainage of the liquid in the collector plate and the exposed piping when the recirculation pump is shut down.

DESCRIPTIONS OF THE DRAWINGS

FIG. 1 is a side elevation view (with parts broken away) of one embodiment of a solar heating system made in accordance with the present invention;

FIG. 2 is a sectional view taken along line 2—2 of FIG. 1;

FIG. 3 is an exploded perspective view of the solar collector panel used in the system;

FIG. 4 is a fragmentary plan view of the collector plate assembly used in the collector panel;

FIG. 5 is a sectional view taken along line 5—5 of FIG. 4; and

DESCRIPTION OF THE PREFERRED EMBODIMENT

Figure 6:
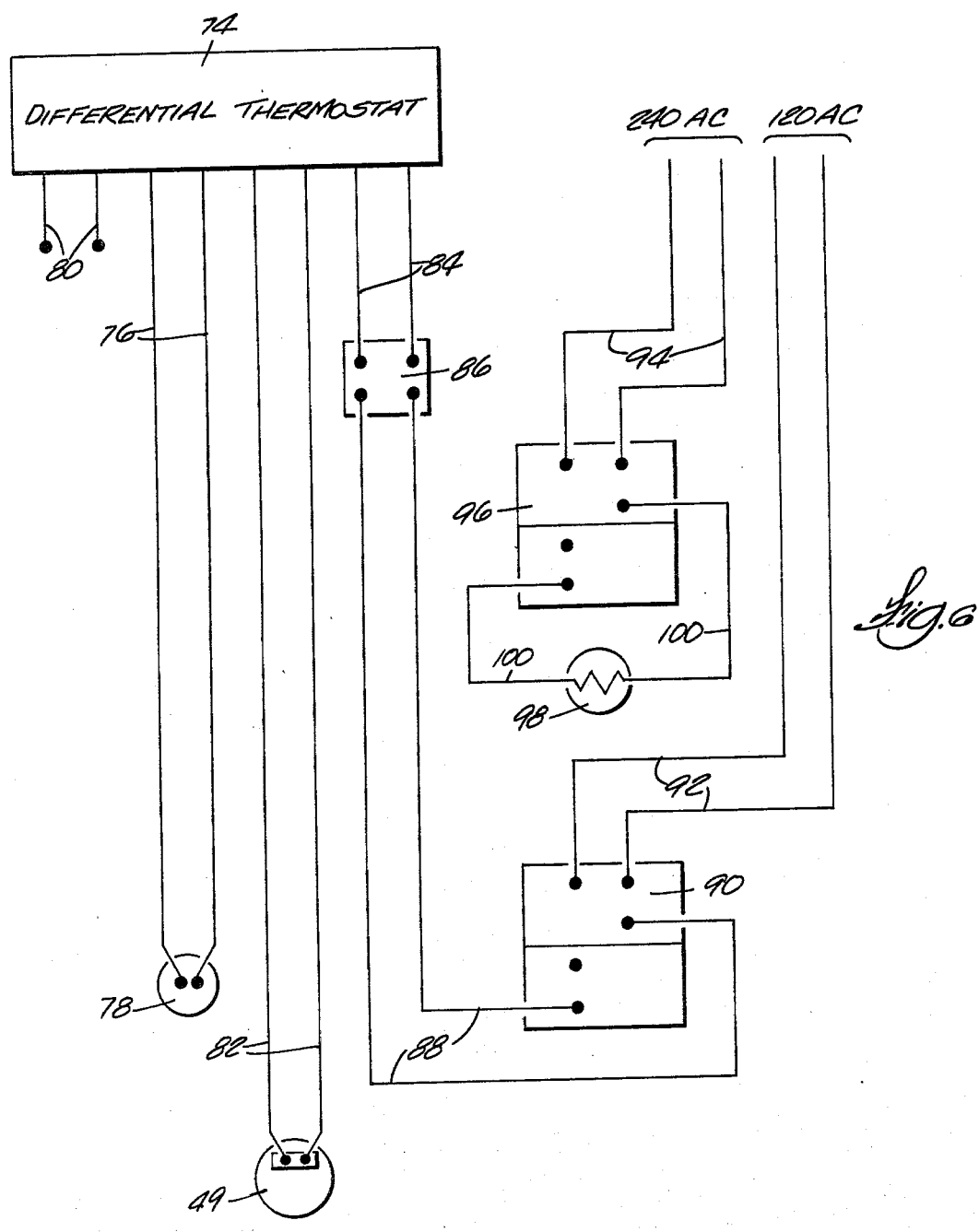
FIG. 6 is a typical schematic wiring diagram for the control components used in the system.

Referring to the drawings in detail the particular embodiment of the present invention shown in the drawings and described hereinafter is designed for use as a water heating system.

As shown in FIG. 1 the system is comprised of two basic components namely a combination storage and heat exchanger unit 10 and a solar collector panel assembly 12. In a typical installation the unit 10 could be located in the basement of a building and the collector panel mounted on the roof of the building. The roof of the building is shown in dotted lines in FIG. 1 and is identified by the reference numeral 14.

Storage and heat exchanger unit 10 is comprised of an outer jacket 16 surrounding a storage tank 18 forming a hot water storage changer 20 therein. The space between the tank and jacket is filled with a suitable insulation material 22. Tank 18 is provided with a cold water inlet 19 and a hot water outlet 21.

A plurality of tubular members 24 are sealed to and extend between tank top 26 and tank bottom 28 to provide a plurality of internal chambers 30 which contain the heat exchange fluid in the system as will be described hereinafter. A second tank bottom member 32 spaced from bottom member 28 provides a space in which a deflector member 34 is mounted.

The lower end of chambers 30 are connected to the lower inlet end of collector panel 12 by means of a line 36. The upper ends of chamber 30 are connected to the upper outlet end of collector panel 12 by pipe manifold assembly 38, a T-fitting 40, a a line 42, a T-fitting 44 and a short line 46.

An air transfer line 48 (of smaller diameter than lines 42, 46) is connected between T-fitting 40 and T-fitting 44 in a parallel flow relationship with line 42. The function and operation of line 48 will be explained in detail hereinafter. An electric motor driven pump unit 49 of suitable design is mounted in line 36.

Referring to FIGS. 3-5, the solar collector panel assembly 12 is comprised of four basic components namely a backplate support member 50, a solar energy collector plate assembly 52, an inner glazing sheet 54 and an outer glazing cover member 56.

Backplate member 50 may be made from any suitable material and in the preferred embodiment is made of galvanized steel. Also in the preferred embodiment the backplate member is provided with an internal layer 58 of insulation material. Member 50 has openings 60,60 therein to facilitate fluid connection between lines 36 and 46 and the collector plate 52. An opening 62 is provided to facilitate attachment of a temperature sensor member (not shown) to the collector plate 52

Collector plate 52 is of unique design and is made by first positioning a pair of steel plates 64,66 in face to face relationship. The plates are seam welded along the edges 68 and spot welded at uniformly spaced points 70. The next step is to apply air pressure to the sealed space between the plates 64,66 for the purpose of expanding the plates to produce a network of internal flow passageways through the unit which passageways are indicated in FIG. 5 by reference numeral 72.

After the collector plate unit has been welded and internally expanded as described above a heat absorbing porcelain glass coating (not shown) is fused to the external surfaces thereof. Such porcelain coating is of a dark color such as dark blue or black.

In the preferred embodiment the inner glazing sheet 54 is made from teflon film material and the outer glazing cover member 56 is made of transparent polyester (reinforced with fiberglass).

The components 50, 52 54 and 56 are securely assembled together in a stacked relationship by means of a pair of longitudinally extending bracket members 74,74 and a plurality of transversely extending bracket members 76 and a plurality of suitable fasteners (not shown).

In operation the panel assembly 12 is positioned to receive the suns rays through the over member 56. Such rays will pass readily through both transparent outer cover 56 and transparent inner teflon sheet 54 and will strike the top surface of porcelain coated collector plate 52.

The solar energy in the rays striking the dark colored porcelain surface of collector plate 52 will be converted into heat. Teflon sheet member 54 and plastic cover member 56 serve to insulate the top surface of collector plate 52 to minimize loss of heat to the atmosphere. Cover member 56 also serves to protect the interior of the collector panel from the weather.

The fluid to be heated by the collector panel 12 is circulated through flow passageways 72 inside collector plate 52 from the inlet to the outlet thereof. As the fluid flows through plate 52 it will absorb heat energy released at the exposed external surface thereof.

OPERATION

As previously indicated while the present invention may have several different useful applications it is shown and described herein as embodied in a water heater system wherein the heat exchange medium which carries heat from the collector panel 12 to the heat exchange unit 10 is distilled water.

FIG. 6 shows a typical control wiring diagram for the system which includes a differential thermostat 74 having a pair of conductors 76,76 which connect to a temperature sensor 78 at the tank unit 10, a pair of conductors 80,80 which connect to a temperature sensor (not shown) at the collector plate 52, a pair of conductors 82,82 which connect to pump 49, and a pair of conductors 84,84 which connect to a service switch 86. A pair of conductors 88,88 connect switch 86 with a water storage tank thermostat 90 and a pair of conductors 92,92 connect thermostat 90 with a 120 VAC power supply. A pair of conductors 94,94 connect a 240 VAC power supply with an electric heating element thermostat 96 which in turn is connected to a heating element 98 by means of a pair of conductors 100,100.

To place the system in operation switch 86 is actuated to its on position. If, as well be the case on a sunny day, the differential between the temperature at the solar panel and the temperature at tank sensor 78 is above a predetermined minimum (16° F. for example) differential thermostat 74 will operate to start pump unit 49.

The operation of pump 49 will cause the heat exchange medium (distilled water in the preferred embodiment) in chambers 30 to be circulated upwardly from the bottom of chambers 30 through line 36 into the lower inlet end of collector plate 52 of panel 12, then through flow passageways 72 in plate 52 and back to the top of chambers 30 through lines 46, 42 and 48. The distilled water passing through plate 52 will pick up heat energy which has been converted from solar energy in the collector panel 12.

The heated water will cascade down through the upper portion of chambers 30 and will flow down to the bottom of chambers 30 and then around deflector member 34 and then back up to the collector panel through line 36. As the distilled water passes downwardly through chambers 30 it will give up heat energy to the water stored in chamber 20 of tank 18.

Such heat transfer from the solar collector panel 12 to water in tank 18 will continue until one of two conditions prevail.

First if the temperature of the water in the tank 18 continues to rise, as may be the case on a sunny day where there is little or no draw off of the hot water in the tank, the tank thermostat 90 will operate at a predetermined maximum temperature (170° F. for example) to shutt off electric power to the control circuit causing pump 49 to shut off.

Alternately to the above condition if, for example, the sun goes down causing the temperature differential between the collector plate 52 and tank sensor 78 to fall below the setting of differential thermostat 74 (8° F.), such differential thermostat will operate to shut off power to pump unit 49.

When this occurs it is important that all of the distilled water in collector plate 52 and in the lines 36, 46, 42 and 48 connecting such plate with heat exchange unit 10 be completely drained. This will preclude any possibility of the distilled water in the collector plate and the exposed lines from freezing.

It will be appreciated that with pump 49 running, collector plate 52 and lines 36, 42, 46 and 48 will be filled with distilled water. When the pump stops the water in collector plate 52 and the connecting lines will begin to flow back into the chambers 30 of the heat exchange unit by gravity. Such flow will tend to create a vacuum in the collector plate which tendency if not prevented will imped complete drainage of the weather exposed portions of the system. The provision of air transfer line 48 insures complete and rapid drainage of the weather exposed portions of the system. This is because when the pump shuts off, the water in line 48 will be partially drawn back up into the collector plate 52 to thereby allow air in chambers 30 to bleed up through line 48 into collector plate and thereby "break" any vacuum which may tend to develop in the system.

As previously indicated line 48 is of a smaller diameter than is line 42 to produce an unbalanced flow condition between the two parallel connected lines 42 and 48. Such unbalanced condition facilitates the air transfer function of the smaller of the two lines, namely line 48. In the preferred embodiment the diameter ratio of line 42 to line 48 is 2 to 1. The above described piping system provides complete and rapid drainage without the need for vents, check values or other more complex arrangements.

It will be appreciated that the use of distilled water as the heat exchange medium provides certain advantages over other types of liquids such as a low freezing point chemical solutions. Distilled water is not only less costly than such solutions but also with distilled water there is not risk of contamination of the water system should a leak occur someplace in the heat exchanger unit.

In situations as described above where during the night, for example, solar collector panel ceases to produce heat, auxiliary heat is provided by heating element 98 to maintain the water temperature in tank 18 above a predetermined minimum.

I claim:

1. A solar heating system for heating water comprising:
 a solar collector panel assembly positioned to receive rays from the sun, said panel including a collector plate assembly adapted to receive the sun's rays on a surface thereof and to convert such rays into heat energy, said collector plate assembly having an inlet and outlet and a flow passageway means therebetween;
 a fluid heat transfer medium for the system which when circulated through said passageway means in said collector plate will absorb heat energy produced by the sun's rays;
 a combination storage tank and heat exchanger unit located at an elevation lower than that of said collector panel, said unit adapted to accommodate the flow of said heat transfer medium therethrough and to transfer heat from such transfer medium into the water to be heated, said heat transfer unit comprised of a storage tank and a plurality of vertically extending heat exchanger tubes mounted inside and sealed from said storage tank, said vertically extending heat exchanger tubes forming a plurality of vertically disposed cylindrical chambers, a fluid heat transfer medium inlet for said combination storage tank and heat exchanger unit communicating with the top ends of said vertically extending heat exchanger tubes and a fluid heat transfer medium outlet for said combinaton storage tank and heat exchanger unit communicating with the bottom ends of said vertically extending heat exchanger tubes;
 conduit means for establishing fluid connection between said collector plate of said solar collector panel and said combination storage tank and heat exchanger unit, said conduit means including first and second fluid conduits, said first fluid conduit connected between said fluid heat transfer medium outlet of said heat exchanger unit and the inlet to said collector plate to carry said heat transfer medium from said heat exchanger unit to said collector plate, said second fluid conduit connected between the outlet of said collector plate and said fluid heat transfer medium inlet of said heat exchanger unit to carry said heat transfer medium from said collector plate outlet to said heat exchanger unit; and
 a pump means for circulating said fluid heat transfer medium from said fluid heat transfer outlet of said combination storage tank and heat exchanger unit through said solar collector panel assembly and then to said fluid heat transfer inlet of said combination storage tank and heat exchanger unit, said fluid heat transfer medium in said vertically disposed cylindrical chambers is maintained at a level intermediate said fluid outlet and fluid inlet when said pump means is running so that the fluid heat transfer medium flowing through the upper portions of said vertically disposed cylindrical chambers above said level will cascade downwardly along the exposed inner surfaces of said cylindrical chambers.

2. A solar heating system for heating water according to claim 1 in which said conduit means for establishing fluid connection between said collector plate of solar collector panel and said combination storage tank and heat exchanger unit includes an air transfer conduit connected between the outlet of said collector plate and said fluid heat transfer medium inlet of said heat exchanger unit, said second fluid conduit and said air transfer conduit being connected in parallel flow relationship with each other, and said air transfer conduit being of a smaller diameter than said second fluid conduit.

3. A solar heating system for heating water according to claim 2 in which said fluid heat transfer medium is distilled water.

* * * * *